United States Patent
Ringenberg et al.

(10) Patent No.: US 11,082,475 B1
(45) Date of Patent: Aug. 3, 2021

(54) MEASURING QUALITY-OF-EXPERIENCE (QOE) FOR VIRTUAL REALITY (VR) STREAMING CONTENT

(71) Applicant: Charter Communications Operating, LLC, St. Louis, MO (US)

(72) Inventors: Matthew Ringenberg, Denver, CO (US); Dhananjay Lal, Englewood, CO (US); Dell Wolfensparger, Langley, WA (US); Andrew Ip, Centennial, CO (US)

(73) Assignee: Charter Communications Operating, LLC, St. Louis, MO (US)

( * ) Notice: Subject to any disclaimer, the term of this patent is extended or adjusted under 35 U.S.C. 154(b) by 0 days.

(21) Appl. No.: 16/743,805

(22) Filed: Jan. 15, 2020

(51) Int. Cl.
*H04L 29/06* (2006.01)
*H04L 12/26* (2006.01)
*H04N 13/327* (2018.01)

(52) U.S. Cl.
CPC ............ *H04L 65/80* (2013.01); *H04L 43/087* (2013.01); *H04L 43/0829* (2013.01); *H04L 65/607* (2013.01); *H04N 13/327* (2018.05)

(58) Field of Classification Search
CPC ..... H04L 65/607; H04L 65/80; H04L 43/087; H04L 43/0829; H04N 13/327
See application file for complete search history.

(56) References Cited

U.S. PATENT DOCUMENTS

| | | | |
|---|---|---|---|
| 8,401,067 B2* | 3/2013 | Kim | H04L 41/509 375/240 |
| 2015/0135245 A1* | 5/2015 | Dunne | H04N 21/2404 725/109 |

OTHER PUBLICATIONS

Tavares da Costa Filho, Roberto Iraja.From 2D to Next Generation VR/AR Videos: Enabling Efficient Streaming via QoE-aware Mobile Networks. Apr. 2019. (Year: 2019).*
J. Bruneau-Queyreix, D. Négru, J. M. Batalla and E. Borcoci, "Multiple description-DASH: Pragmatic video streaming maximizing end-users' quality of experience," 2016 IEEE International Conference on Communications (ICC), Kuala Lumpur, 2016, pp. 1-7, doi: 10.1109/ICC.2016.7511205. (Year: 2016).*

(Continued)

*Primary Examiner* — John M MacIlwinen
(74) *Attorney, Agent, or Firm* — Withrow & Terranova, PLLC

(57) ABSTRACT

Measuring quality-of-experience (QoE) for virtual reality (VR) streaming content is disclosed. A network computing device receives a client-side VR stream capture and a client pose data set that are generated by a client computing device based on a VR content and one or more induced network impairments (e.g., latency, packet loss, and/or jitter, as non-limiting examples). Using the same VR content and the client pose data set, the network computing device generates a source VR stream capture that is not subjected to the one or more induced network impairments. The network computing device performs a frame-by-frame comparison of the client-side VR stream capture and the source VR stream capture. Based on the frame-by-frame comparison, the network computing device generates a QoE metric that indicates a degree of degradation of the client-side VR stream capture relative to the source VR stream capture.

20 Claims, 10 Drawing Sheets

(56) References Cited

OTHER PUBLICATIONS

Ashutosh Singla, Steve Göring, Alexander Raake, Britta Meixner, Rob Koenen, and Thomas Buchholz. 2019. Subjective quality evaluation of tile-based streaming for omnidirectional videos. In Proceedings of the 10th ACM Multimedia Systems Conference (MMSys '19). pp. 232-242. (Year: 2019).*
X. Corbillon, G. Simon, A. Devlic and J. Chakareski, "Viewport-adaptive navigable 360-degree video delivery," 2017 IEEE International Conference on Communications (ICC), Paris, 2017, pp. 1-7, doi: 10.1109/ICC.2017.7996611. (Year: 2017).*
T. Abar, A. Ben Letaifa and S. El Asmi, "Machine learning based QoE prediction in SDN networks," 2017 13th International Wireless Communications and Mobile Computing Conference (IWCMC), Valencia, 2017, pp. 1395-1400, doi: 10.1109/IWCMC.2017.7986488. (Year: 2017).*
W. Cherif, A. Ksentini, D. Négru and M. Sidibé, "A_PSQA: Efficient real-time video streaming QoE tool in a future media internet context," 2011 IEEE International Conference on Multimedia and Expo, Barcelona, 2011, pp. 1-6, doi: 10.1109/ICME.2011.6011993. (Year: 2011).*
Kim, H.J., Choi, S.G. QoE assessment model for multimedia streaming services using QoS parameters. Multimed Tools Appl 72, 2163-2175 (2014). https://doi.org/10.1007/s11042-013-1507-8 (Year: 2014).*

* cited by examiner

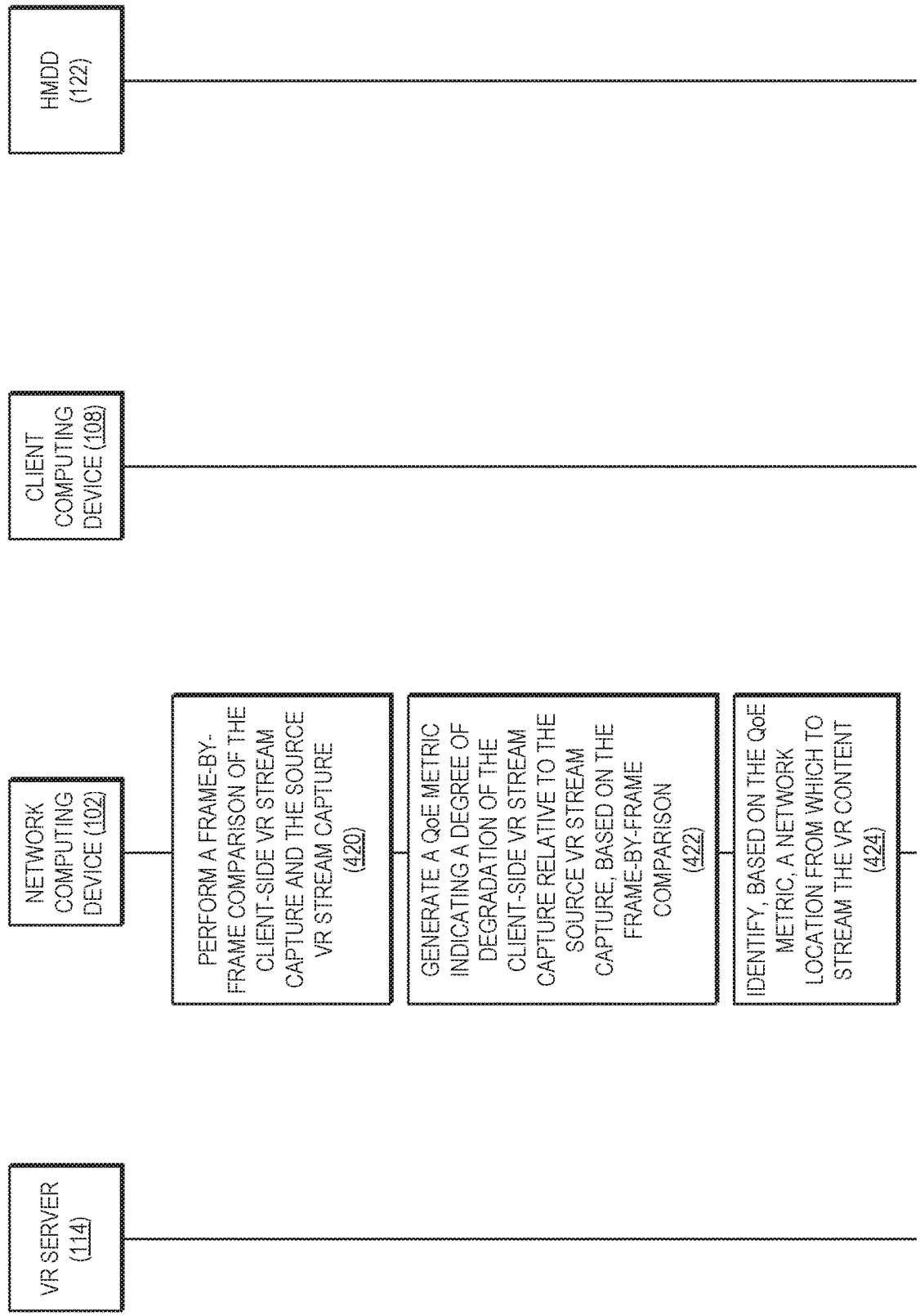

MEASURING QUALITY-OF-EXPERIENCE (QOE) FOR VIRTUAL REALITY (VR) STREAMING CONTENT

BACKGROUND

Virtual reality (VR) streaming enables a user to experience an immersive virtual world through the use of a VR head-mounted display device (HMDD) that renders high-resolution VR content. Because the VR content is streamed to the HMDD via a network connection, the user's VR experience may be negatively impacted by various network impairments, such as latency, packet loss, and jitter, as non-limiting examples. If the network impairments are sufficiently severe, the user may experience unpleasant or uncomfortable side effects, such as motion sickness. However, it may be difficult to ascertain how a given set of network impairments affects the quality-of-experience (QoE) for a user of a given VR content.

SUMMARY

The embodiments disclosed herein measure quality-of-experience (QoE) for virtual reality (VR) streaming content by generating a QoE metric based on a comparison of a client-side VR stream capture of a VR stream that is subjected to one or more induced network impairments, and a source VR capture based on the same VR stream without the one or more induced network impairments.

In one embodiment, a method for measuring QoE for VR streaming content is provided. The method includes receiving, by a network computing device, a client-side VR stream capture and a client pose data set generated based on VR content and one or more induced network impairments. The method further includes generating a source VR stream capture based on the VR content and the client pose data set without the one or more induced network impairments. The method also includes performing a frame-by-frame comparison of the client-side VR stream capture and the source VR stream capture. The method additionally includes generating a QoE metric indicating a degree of degradation of the client-side VR stream capture relative to the source VR stream capture, based on the frame-by-frame comparison.

In another embodiment, a computing system is provided. The computing system includes a network computing device that includes a first memory and a first processor device coupled to the first memory. The first processor device is configured to receive a client-side VR stream capture and a client pose data set generated based on VR content and one or more induced network impairments. The first processor device is further configured to generate a source VR stream capture based on the VR content and the client pose data set without the one or more induced network impairments. The first processor device is also configured to perform a frame-by-frame comparison of the client-side VR stream capture and the source VR stream capture. The first processor device is additionally configured to generate a QoE metric indicating a degree of degradation of the client-side VR stream capture relative to the source VR stream capture, based on the frame-by-frame comparison.

In another embodiment, a computer program product is provided. The computer program product is stored on a non-transitory computer-readable storage medium and includes computer-executable instructions configured to cause a processor device to receive a client-side VR stream capture and a client pose data set generated based on VR content and one or more induced network impairments. The computer-executable instructions are further configured to cause the processor device to generate a source VR stream capture based on the VR content and the client pose data set without the one or more induced network impairments. The computer-executable instructions are also configured to cause the processor device to perform a frame-by-frame comparison of the client-side VR stream capture and the source VR stream capture. The computer-executable instructions are additionally configured to cause the processor device to generate a QoE metric indicating a degree of degradation of the client-side VR stream capture relative to the source VR stream capture, based on the frame-by-frame comparison.

Those skilled in the art will appreciate the scope of the disclosure and realize additional aspects thereof after reading the following detailed description of the embodiments in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

FIGS. 4A-4C are message sequence diagrams illustrating messages sent and operations performed when measuring QoE for VR streaming content in accordance with some embodiments;

DETAILED DESCRIPTION

Figure 1:
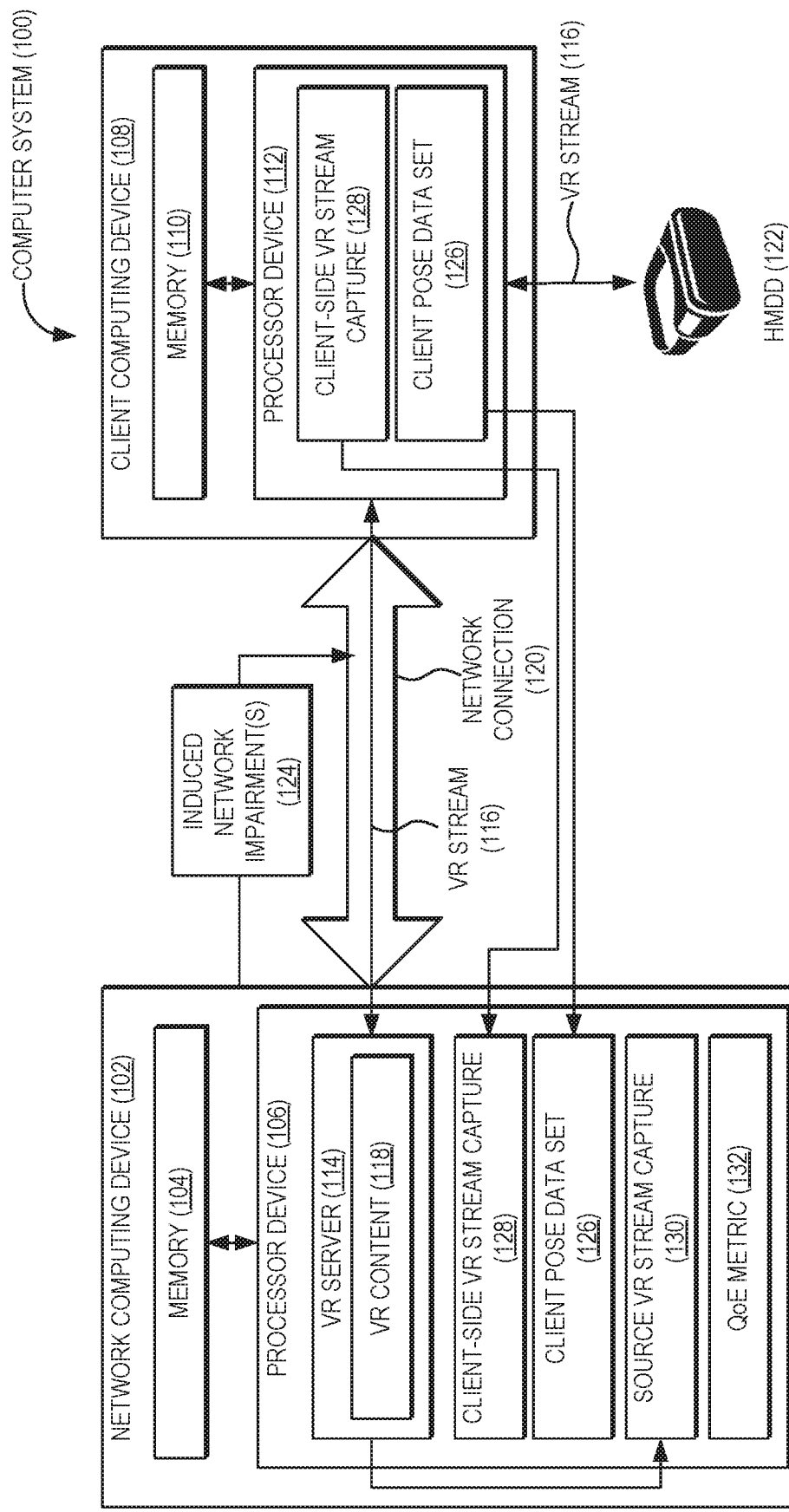
FIG. 1 is a block diagram illustrating a computer system, including a network computing device and a client computing device, configured to measure quality-of-experience (QoE) for virtual reality (VR) streaming content, according to some embodiments.

The embodiments set forth below represent the information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the embodiments are not limited to any particular sequence of steps. The use herein of ordinals in conjunction with an element is solely for distinguishing what might otherwise be similar or identical labels, such as "first message" and "second message," and does not imply an order, a priority, a type, an importance, or other attribute, unless otherwise stated herein. The term "about" used herein in conjunction with a numeric value means any value that is within a range of ten percent greater than or ten percent less than the numeric value.

As used herein and in the claims, the articles "a" and "an" in reference to an element refers to "one or more" of the element unless otherwise explicitly specified. The word "or" as used herein and in the claims is inclusive unless contextually impossible. As an example, the recitation of A or B means A, or B, or both A and B.

Virtual reality (VR) streaming, used in conjunction with VR head-mounted displays (HMDDs), provides an immersive experience to a user in a virtual world defined by VR content. Rendering stereoscopic high-resolution imagery that depicts the virtual world to the user via the HMDD as the user moves about the virtual world can require a substantial amount of processing power. However, image-rendering graphics processing units (GPUs) may be expensive in terms of both money and energy consumption, and may even require a cooling system to prevent overheating. Accordingly, to provide an HMDD that is lightweight, compact, and comfortable for the user, the HMDD may lack an integrated image-rendering GPU. Instead, a network computing device with one or more GPUs may, in real-time, generate and stream to the HMDD a VR stream that includes imagery depicting the virtual world based on the current virtual location of the user in the virtual world, and the current orientation (including the direction) of the view of the user in the virtual world.

In practice, any number of switches, bridges, routers or other network communications devices (referred to generally herein as "switch devices") may be in the communications path between the image-rendering network computing device and the HMDD. Moreover, in some implementations, there may be a relatively large physical distance between the network computing device and the HMDD. These and other factors can result in the occurrence of network impairments, such as latency (i.e., delay in a packet of information communicated from one computing device to another), packet loss, and jitter, as non-limiting examples. These network impairments may result from any number of factors, including, as non-limiting examples, a physical distance between the network computing device and the HMDD, the number of switch devices in the network communications path between the network computing device and the HMDD, network conditions, the types of media used to interconnect devices in the communications path, changing load conditions on one or more of the devices, and the like.

An HMDD has a field of view (FOV) that defines a horizontal and vertical extent of what a user in a virtual world can visually perceive at an instant in time. As the user moves about the virtual world, the HMDD continuously provides orientation and movement data (collectively referred to herein as "client pose data") to the image-rendering network computing device. As the user moves her head, the scene encompassed by the FOV of the HMDD changes, similar or identical to the manner in which the scene within the FOV of human eyes changes as a human moves her head about the real world.

If network conditions between the HMDD and the network computing device are not impaired, the delay of time between the HMDD sending a current location and orientation of the HMDD to the network computing device, the rendering of the corresponding imagery by the network computing device, the communication of the rendered imagery to the HMDD, and the presentation of the rendered imagery by the HMDD to the participant may result in few or no visual discontinuities. However, if network impairments are present, the resulting delay of time may result in substantial visual discontinuities in the form of banding, blacked-out portions of the scene, or the like. Sufficiently severe network impairments may even cause the user to experience unpleasant or uncomfortable side effects, such as motion sickness.

Some VR content may more susceptible to network impairments and the associated negative effects on the user's QoE than other VR content. For example, VR content in which the user and/or most virtual world elements are static or not in motion (e.g., a virtual world chess game) may be less affected by network impairments than VR content having a relatively large number of moving or interactive elements (e.g., a virtual world first-person shooter game). If the effects of a specified set of network impairments on the QoE of a specified VR content can be experimentally determined and quantified, the effects of the network impairments may be mitigated by, e.g., identifying an appropriate network location from which to stream the VR content to maximize the QoE for the user.

In this regard, the embodiments disclosed herein provide a mechanism for generating a QoE metric indicating how a given set of network impairments may affect the QoE for a user of a given VR content. In particular, the embodiments relate to methods and systems in which a network computing device receives a client-side VR stream capture and a client pose data set that are generated based on a VR content and one or more induced network impairments (e.g., latency, packet loss, and/or jitter, as non-limiting examples). Using the same VR content and the client pose data set, the network computing device generates a source VR stream capture that is not subjected to the one or more induced network impairments. By performing a frame-by-frame comparison of the client-side VR stream capture and the source VR stream capture, the network computing device can generate a QoE metric that indicates a degree of degradation of the client-side VR stream capture relative to the source VR stream capture.

FIG. 1 is a block diagram illustrating a computer system 100 that may be utilized to stream VR content and generate a QoE metric based on induced network impairments. The computer system 100 in the example of FIG. 1 includes a network computing device 102 comprising a memory 104 communicatively coupled to a processor device 106, and also includes a client computing device 108 comprising a memory 110 communicatively coupled to a processor device 112. The processor device 106 of the network computing device 102 is configured to provide a VR server 114 for generating a VR stream 116, based on VR content 118, to be streamed via a network connection 120 to an HMDD 122 communicatively coupled to the client computing device 108. The VR content 118 defines a virtual world that is rendered and displayed to a user of the HMDD 122, thus providing an immersive experience for the user. The HMDD 122 in some embodiments is configured to be coupled to a head of a user, such as via a frame similar to glasses, or via straps, a helmet, a cap, or the like. The network connection 120 may be provided by a network including one or more different transmission media, such as, by way of non-limiting example, an optical transmission medium, an electrical transmission medium, a wireless transmission medium, or any combination thereof.

In the example of FIG. 1, the HMDD 122 relatively continuously streams information to the client computing device 108 and on to the network computing device 102 via the network connection 120 that identifies actions taken by the user. The network computing device 102 continuously updates the VR stream 116 in response to actions taken by the user to reflect a current state of the virtual world. The HMDD 122 also relatively continuously streams information to the client computing device 108 and the network computing device 102 regarding client pose data that identifies a position and an orientation of the HMDD 122. The pose data may include, for example, roll, yaw, and pitch data generated by an inertial measurement unit sensor (IMU) of the HMDD 122.

The network computing device 102 receives the client pose data and iteratively, based on the most recently received client pose data, determines a scene within the virtual world that is within an FOV of the HMDD 122. The network computing device 102 renders imagery that depicts the scene at that instant in time based on the position and orientation of the HMDD 122 identified in the client pose data and the FOV of the HMDD 122, and sends the imagery to the HMDD 122 via the network connection 120. The HMDD 122 receives the imagery and presents the imagery on a display device of the HMDD 122 for viewing by the user. This process happens periodically, such as 30 or 60 times a second. In this manner, the user can be presented with imagery of the virtual world consistent with the position and movements of the user, resulting in an enjoyable immersive experience for the user.

To measure how network impairments may affect the QoE for a user of the VR content 118, the network computing device 102 and the client computing device 108 first establish the network connection 120. The network computing device 102 then streams the VR stream 116 of the VR content 118 from the VR server 114 to the HMDD 122 via the client computing device 108. The network computing device 102 next intentionally injects one or more induced network impairments 124 into the network connection 120. Injecting the one or more induced network impairments 124 may comprise, as non-limiting examples, modifying the transmission of network traffic to simulate increased network latency, packet loss, and/or jitter within the network connection 120. As the HMDD 122 renders the VR stream 116, the client computing device 108 records movements of the HMDD 122 as a client pose data set 126. The client pose data set 126 represents a record over time of a position of the HMDD 122 and/or an orientation of the HMDD 122 as the VR stream 116 is rendered. The client computing device 108 also records the visual output generated by the HMDD 122 as a client-side VR stream capture 128. The client-side VR stream capture 128 and the client pose data set 126 are then sent to the network computing device 102.

The network computing device 102 generates a source VR stream capture 130 based on the VR content 118 and the client pose data set 126, without the one or more induced network impairments 124. Because it is based on the VR content 118 and the client pose data set 126, the source VR stream capture 130 recreates the same virtual world experience recorded by the client-side VR stream capture, but without any degradation caused by the one or more induced network impairments 124. The network computing device 102 next performs a frame-by-frame comparison of the client-side VR stream capture 128 and the source VR stream capture 130, using image processing techniques known in the art. Based on the frame-by-frame comparison, the network computing device 102 generates a QoE metric 132. The QoE metric 132 represents a degree of degradation of the client-side VR stream capture 128 relative to the source VR stream capture 130. In some embodiments, the QoE metric 132 may comprise a Structural Similarity Index Metric (SSIM), which assigns a score that quantifies how identical the client-side VR stream capture 128 is to the source VR stream capture 130.

Figure 2:
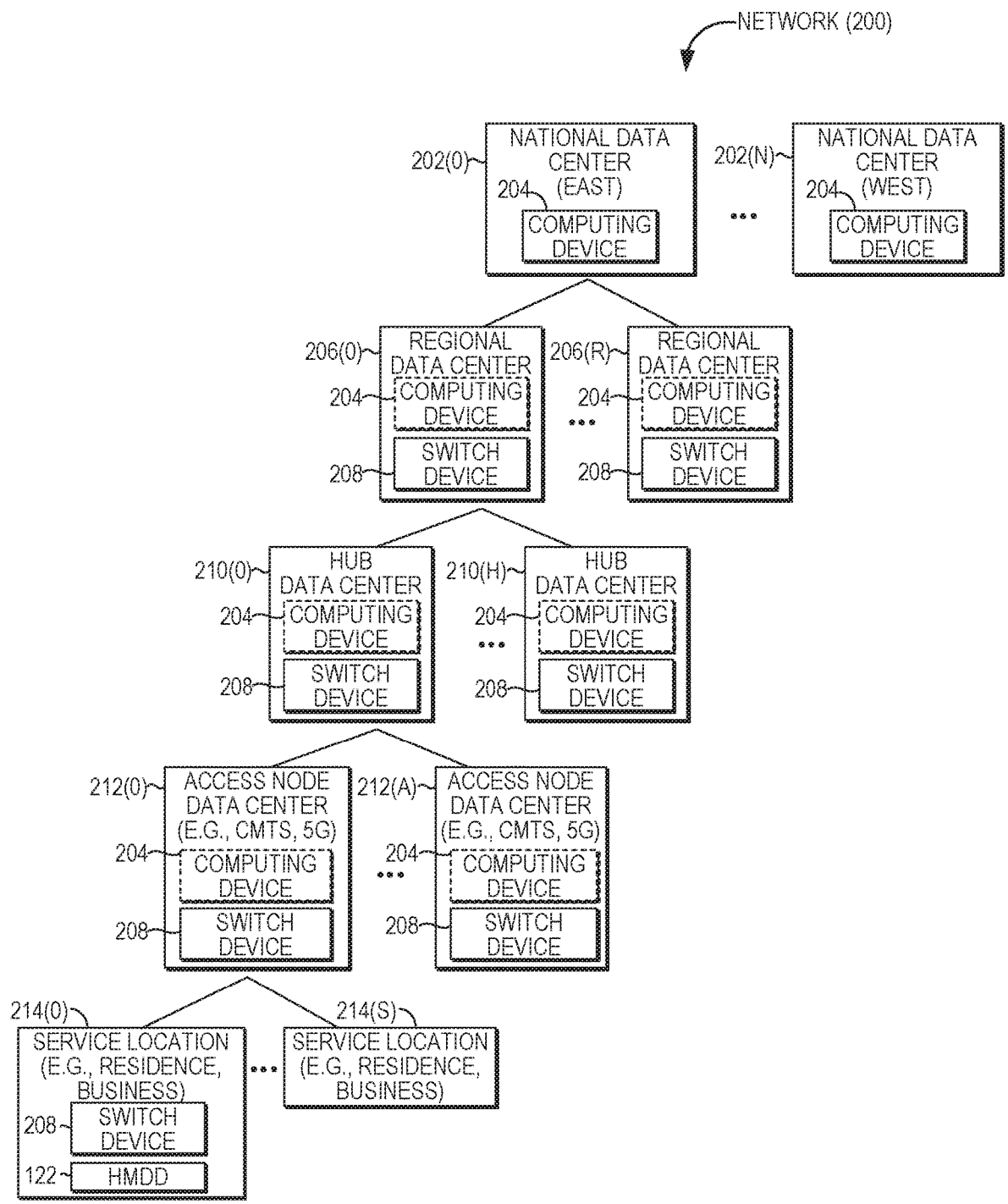
FIG. 2 is a block diagram illustrating a network that may be utilized in streaming VR content, according to some embodiments.

Some embodiments may provide that the QoE metric 132 may be used to improve user experience by identifying an appropriate network location from which to stream the VR content 118. In this regard, FIG. 2 illustrates a network 200 that may be employed for streaming VR content according to some embodiments. As seen in FIG. 2, the network 200 represents a network of a national service provider that includes one or more national data centers 202(0)-202(N) (generally, national data centers 202). Each national data center 202 may serve, e.g., different regions of a country, and may include one or more image-rendering (IR) computing devices 204 that is suitable for rendering imagery of a virtual world as specified by VR content. In other words, the IR computing devices 204 may contain suitable central processing units (CPUs), graphics processing units (GPUs), and suitable electrical and cooling infrastructure for high-resolution image generation.

Each of the national data centers 202 is communicatively coupled to a plurality of regional data centers 206(0)-206(R) (illustrated only with respect to the national data center 202(0) due to space considerations). The regional data centers 206(0)-206(R) may also include one or more IR computing devices 204, and further include one or more switch devices 208 which process communications that traverse through the respective regional data centers 206(0)-206(R).

The regional data centers 206(0)-206(R) are each communicatively coupled to a plurality of hub data centers 210(0)-210(H) (illustrated only with respect to the regional data center 206(0) due to space considerations). The hub data centers 210(0)-210(H) may also have one or more IR computing devices 204 suitable for rendering imagery. The hub data centers 210(0)-210(H) also include one or more switch devices 208, which process communications that traverse through the respective hub data centers 210(0)-210(H).

Each of the hub data centers 210(0)-210(H) is communicatively coupled to a plurality of access node data centers 212(0)-212(A) (illustrated only with respect to the hub data center 210(0) due to space considerations). The access node data centers 212(0)-212(A) may also have one or more IR computing devices 204 suitable for rendering imagery. The access node data centers 212(0)-212(A) also include one or more switch devices 208, which process communications that traverse through the respective access node data centers 212(0)-212(A).

Finally, each of the access node data centers 212(0)-212(A) is communicatively coupled to one or more service locations 214(0)-214(S) (illustrated only with respect to the access node data center 212(0) due to space considerations). In the example of FIG. 2, the service location 214(0) includes an HMDD such as the HMDD 122 of FIG. 1, and may also include one or more switch devices 208, such as an optical-to-electrical converter and a local area network (LAN) router.

In exemplary operation, VR content that is generated by the IR computing device 204 of the national data center 202(0) and communicated to the HMDD 122 traverses through one or more switch devices 208 in the regional data center 206(0), one or more switch devices 208 in the hub data center 210(0), one or more switch devices 208 in the access node data center 212(0), and possibly one or more switch devices 208 of the service location 214(0) prior to reaching the HMDD 122. Each of these switch device(s) 208 introduces at least a small amount of latency. Moreover, the national data center 202(0) may be geographically hundreds or thousands of miles from the service location 214(0), resulting in additional latency. Data communicated by the HMDD 122 to the IR computing device 204 of the national data center 202(0), such as pose data, traverses the same path in reverse.

The network 200 is hierarchical, and each descending level has a greater number of data centers. Thus, there are a greater number of regional data centers 206 than national data centers 202, a greater number of hub data centers 210 than regional data centers 206, and a greater number of access node data centers 212 than hub data centers 210. Generating a VR stream in the access node data center 212(0) would reduce latency, but the costs of provisioning each access node data center 212 with one or more IR computing devices 204, along with suitable electrical and cooling infrastructure, may be cost prohibitive. From a cost standpoint, it would be desirable to only provision the national data centers 202 with the IR computing devices 204 because there are fewer national data centers 202. However, the latency will be greatest in the communications path between the national data center 202(0) and the HMDD 122 than that of any other data center at a lower hierarchical level of the network 200 and the HMDD 122.

In this regard, the QoE metric 132 of FIG. 1 may be used to identify a network location (e.g., a national data center 202, a regional data center 206, a hub data center 210, or an access node data center 212) from which to stream the VR content 118. For example, by selecting the one or more induced network impairments 124 to simulate the expected latency, packet loss, jitter, or other network impairments that are expected to result from streaming the VR content 118 from a given level of the hierarchy of the network 200, the resulting QoE metric 132 may indicate whether the resulting user experience is acceptable for streaming the VR content 118 from that level of the network 200.

Figure 3:
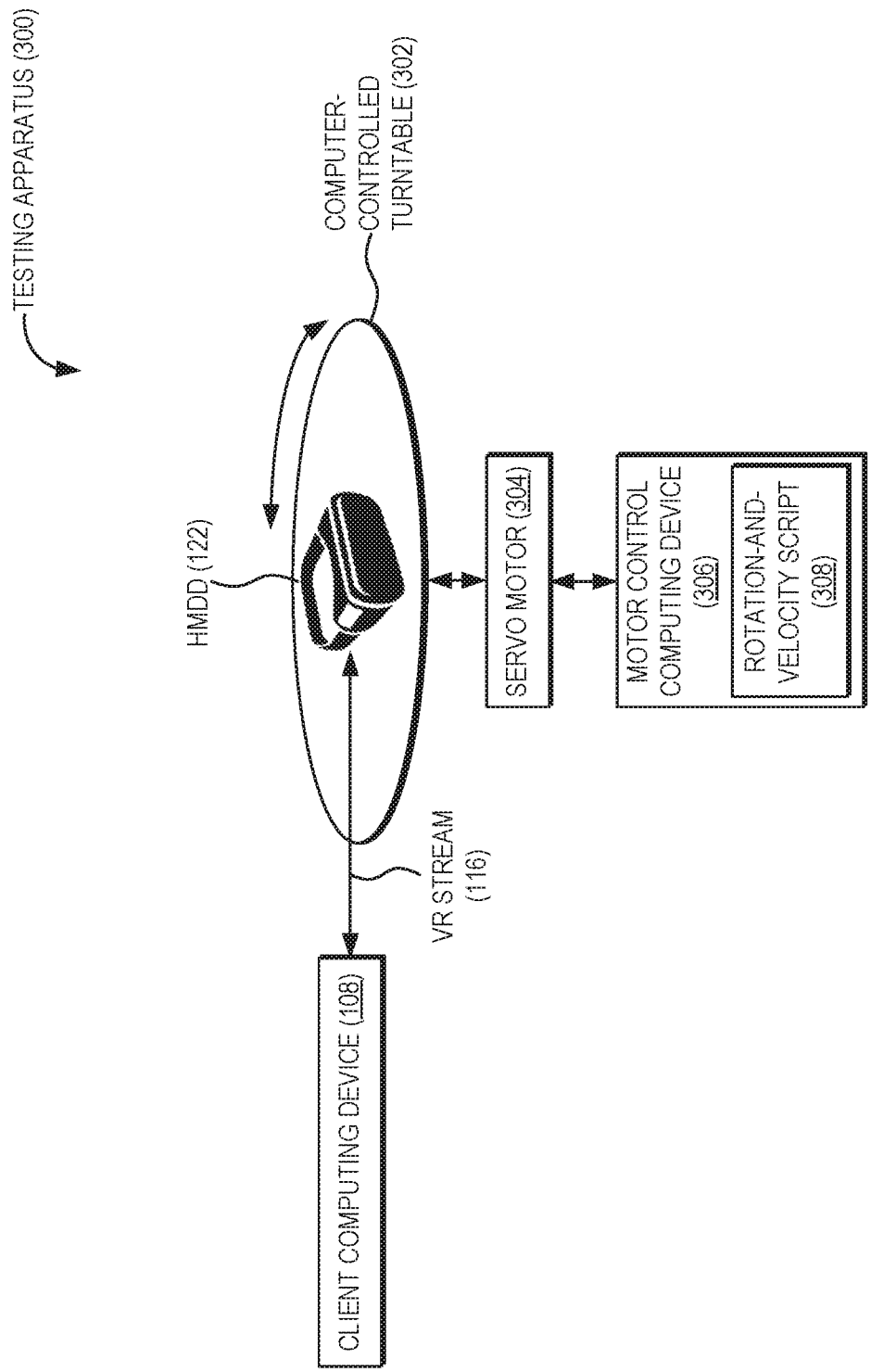
FIG. 3 is a block diagram illustrating exemplary test equipment that may be employed in conjunction with the client computing device of FIG. 1 to generate the client-side VR stream capture and client pose data set, according to some embodiments.

According to some embodiments, a testing apparatus may be provided to generate controlled movements of the HMDD 122 of FIG. 1 for testing the effect of network impairments on user QoE. In this regard, FIG. 3 illustrates an exemplary testing apparatus 300 that includes a computer-controlled turntable 302 to which the HMDD 122 of FIG. 1 is affixed. The computer-controlled turntable 302 is coupled to a servo motor 304 that is controlled by a motor control computing device 306. The motor control computing device 306 is configured to execute a rotation-and-velocity script 308 that specifies a series of rotations and corresponding rotation velocities. Based on the rotation-and-velocity script 308, the motor control computing device 306 causes the servo motor 304 to selectively rotate the computer-controlled turntable 302, thereby causing the HMDD 122 to also rotate as it renders the VR stream 116 relayed by the client computing device 108 of FIG. 1. The movements of the HMDD 122 as it is rotated on the computer-controlled turntable 302 are then recorded by the client computing device 108 as the client pose data set 126, while the visual output generated by the HMDD 122 as it is rotated on the computer-controlled turntable 302 is recorded by the client computing device 108 as the client-side VR stream capture 128.

The rotation-and-velocity script 308 can be customized according to the type of the VR content 118 being streamed to more accurately simulate expected user motions. This, in turn, enables a more accurate QoE metric 132 to be generated for the VR content 118. For example, in embodiments in which the VR content 118 is a virtual first-person shooter game, the rotation-and-velocity script 308 may specify movements that are faster, more frequent, and/or more extreme than would be expected if the VR content 118 is a virtual chess game.

Figure 4A:
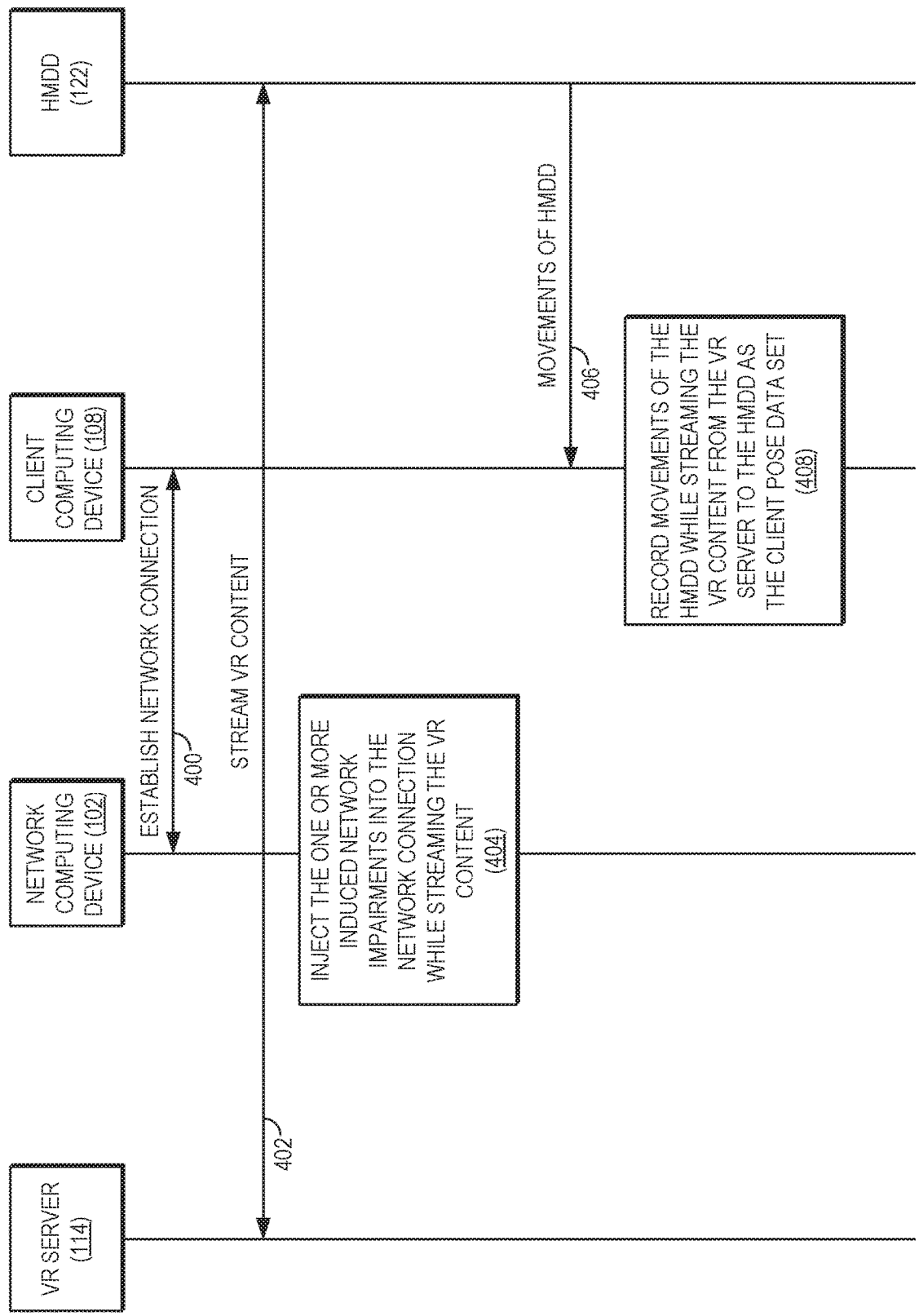
Figure 4B:
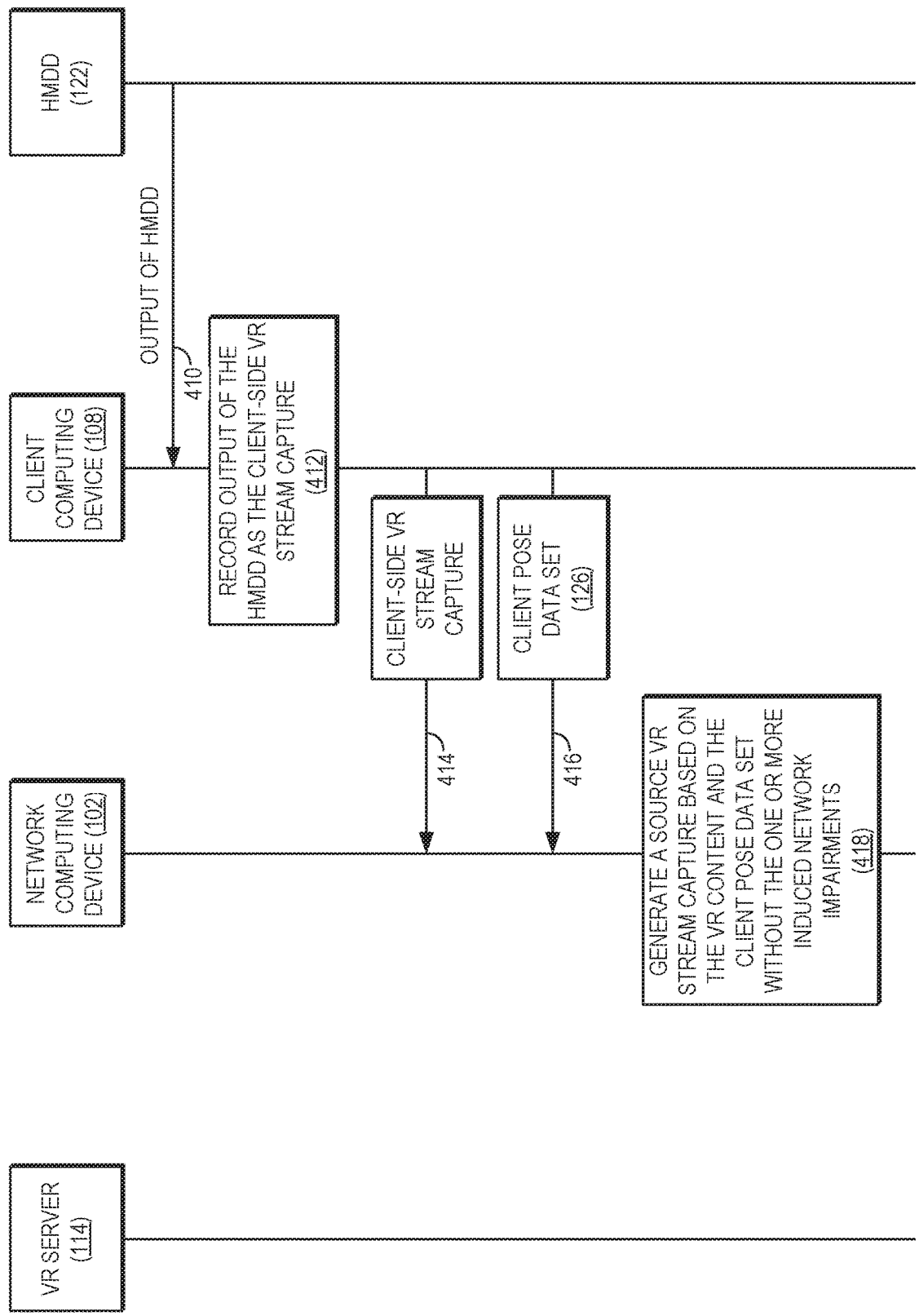

FIGS. 4A-4C are message sequence diagrams that illustrate messages sent and operations performed when measuring QoE for VR streaming content in accordance with some embodiments. Elements of FIGS. 1 and 3 are referenced in describing FIGS. 4A-4C for the sake of clarity. As seen in FIGS. 4A-4C, the VR server 114, the network computing device 102, the client computing device 108, and the HMDD 122 of FIG. 1 are represented by vertical lines, with communications between these elements illustrated by captioned arrows and operations performed by these elements illustrated by captioned blocks.

In FIG. 4A, operations begin with the establishment of the network connection 120 between the network computing device 102 and the client computing device 108, as indicated by arrow 400. The VR content 118 is then streamed, via the network connection 120, from the VR server 114 of the network computing device 102 to the HMDD 122 communicatively coupled to the client computing device 108, as indicated by arrow 402. The network computing device 102 next injects the one or more induced network impairments 124 into the network connection 120 while streaming the VR content 118 from the VR server 114 to the HMDD 122, as indicated by block 404.

The client computing device 108 then detects movements of the HMDD 122 (e.g., as the HMDD 122 is rotated by the computer-controlled turntable 302 to which the HMDD 122 is affixed, according to the rotation-and-velocity script 308 of FIG. 3), as indicated by arrow 406. The client computing device 108 records the movements of the HMDD 122 while streaming the VR content 118 from the VR server 114 to the HMDD 122 as the client pose data set 126, as indicated by block 408. In some embodiments, the client pose data set 126 may include data that represents, for example, a position of the HMDD 122 and/or an orientation of the HMDD 122 at a given time during the movements of the HMDD 122. Operations then continue in FIG. 4B.

Referring now to FIG. 4B, the client computing device 108 also receives output from the HMDD 122, as indicated by arrow 410. The output from the HMDD 122 may comprise, as a non-limiting example, a plurality of frames of image data representing the view that a user wearing the HMDD 122 would experience. The client computing device 108 then records the visual output of the HMDD 122 as the client-side VR stream capture 128, as indicated by block 412. The client computing device 108 transmits the client-side VR stream capture 128 to the network computing device 102, as indicated by arrow 414, and also transmits the client pose data set 126 to the network computing device 102, as indicated by arrow 416. Using the VR content 118 and the client pose data set 126, the network computing device 102 generates the source VR stream capture 130 without the one or more induced network impairments 124, as indicated by block 418. The source VR stream capture 130 thus represents a VR stream of the VR content 118 under ideal network conditions. Operations then continue in FIG. 4C.

Turning now to FIG. 4C, the network computing device 102 performs a frame-by-frame comparison of the client-side VR stream capture 128 and the source VR stream capture 130, as indicated by block 420. Based on the frame-by-frame comparison, the network computing device 102 generates the QoE metric 132 that indicates a degree of degradation of the client-side VR stream capture 128 relative to the source VR stream capture 130, as indicated by block 422. As a non-limiting example, the QoE metric 132 may comprise an SSIM. In some embodiments, the QoE metric 132 may be used by the network computing device 102 to identify a network location (e.g., a level within the hierarchy of the network 200 of FIG. 2) from which to stream the VR content 118, as indicated by block 424.

Figure 5:
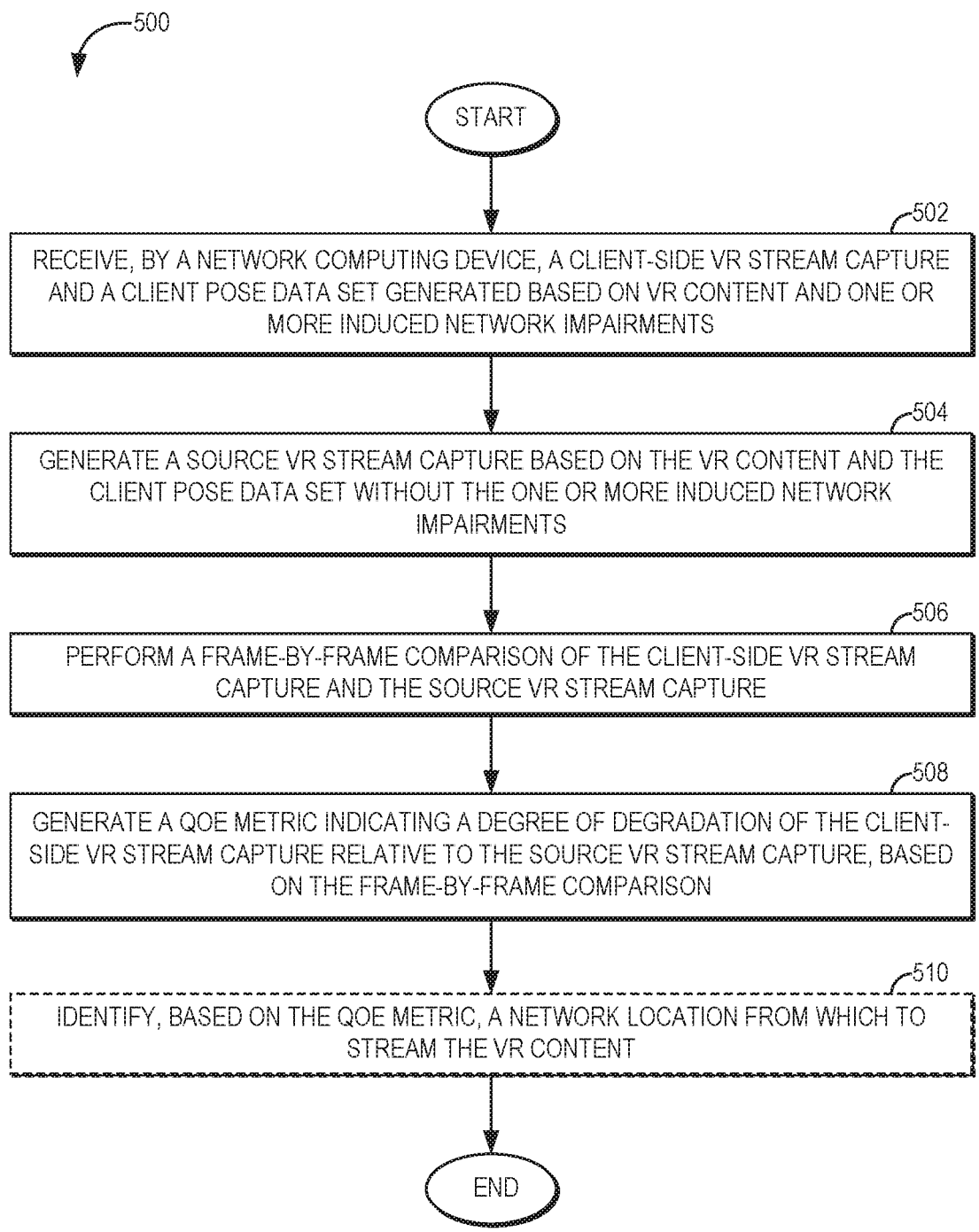
FIG. 5 is a flowchart illustrating exemplary operations for measuring QoE for VR streaming content from the perspective of the network computing device of FIG. 1, according to some embodiments.

To illustrate exemplary operations for compensating for measuring QoE for VR streaming content from the perspective of the network computing device 102 of FIG. 1 according to some embodiments, FIG. 5 provides a flowchart 500. For the sake of clarity, elements of FIG. 1 are referenced in describing FIG. 5. Operations in FIG. 5 begin with the network computing device 102 receiving the client-side VR stream capture 128 and the client pose data set 126 generated (e.g., by the client computing device 108 of FIG. 1) based on the VR content 118 and the one or more induced network impairments 124 (block 502). The network computing device 102 generates the source VR stream capture 130 based on the VR content 118 and the client pose data set 126 without the one or more induced network impairments 124 (block 504).

The network computing device 102 then performs a frame-by-frame comparison of the client-side VR stream capture 128 and the source VR stream capture 130 (block 506). Based on the frame-by-frame comparison, the network computing device 102 generates the QoE metric 132 indicating a degree of degradation of the client-side VR stream capture 128 relative to the source VR stream capture 130 (block 508). In some embodiments, the QoE metric 132 may comprise an SSIM generated by the network computing device 102. Some embodiments may provide that the network computing device 102 identifies, based on the QoE metric 132, a network location (e.g., one of the hierarchical levels of the network 200 of FIG. 2) from which to stream the VR content 118 (block 510).

Figure 6:
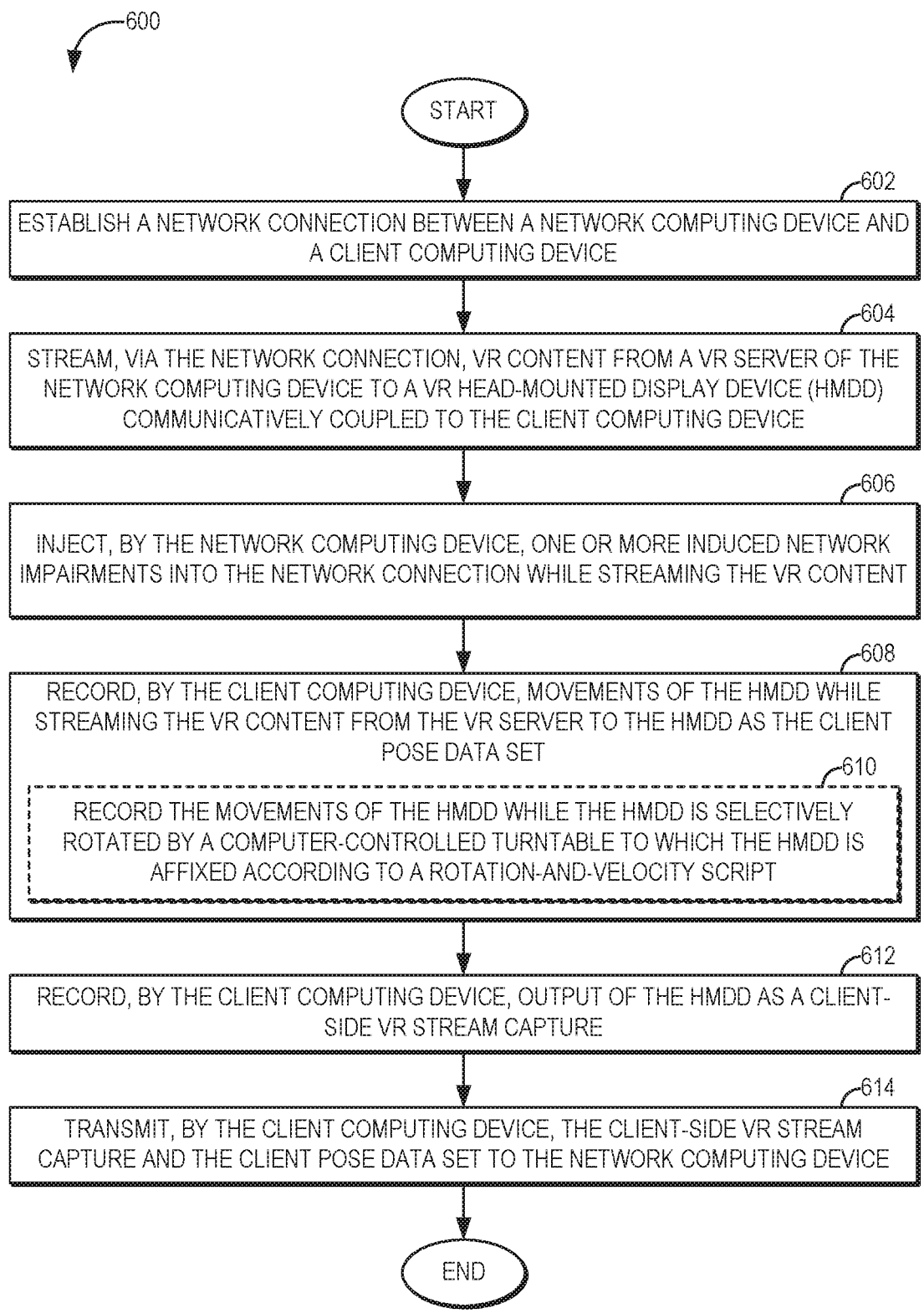
FIG. 6 is a flowchart illustrating exemplary operations for generating the client-side VR stream capture and client pose data set from the perspective of the client computing device of FIG. 1, according to some embodiments.

FIG. 6 provides a flowchart 600 that illustrates exemplary operations for generating the client-side VR stream capture 128 and the client pose data set 126 from the perspective of the client computing device 108 of FIG. 1, according to some embodiments. Elements of FIGS. 1 and 3 are referenced in describing FIG. 6 for the sake of clarity. In FIG. 6, operations begin with the establishment of the network connection 120 between the network computing device 102 and the client computing device 108 (block 602). The VR content 118 is then streamed, via the network connection 120, from the VR server 114 of the network computing device 102 to the HMDD 122 communicatively coupled to the client computing device 108 (block 604).

The network computing device 102 then injects the one or more induced network impairments 124 into the network connection 120 while streaming the VR content 118 from the VR server 114 to the HMDD 122 (block 606). The client computing device 108 records movements of the HMDD 122 while streaming the VR content 118 from the VR server 114 to the HMDD 122 as the client pose data set 126 (block 608). In some embodiments, the operations of block 608 for recording the movements of the HMDD 122 may comprise recording the movements of the HMDD 122 while the HMDD 122 is selectively rotated by the computer-controlled turntable 302 to which the HMDD 122 is affixed according to the rotation-and-velocity script 308 (block 610). The client computing device 108 records the visual output of the HMDD 122 as the client-side VR stream capture 128 (block 612). The client computing device 108 then transmits the client-side VR stream capture 128 and the client pose data set 126 to the network computing device 102 (block 614).

Figure 7:
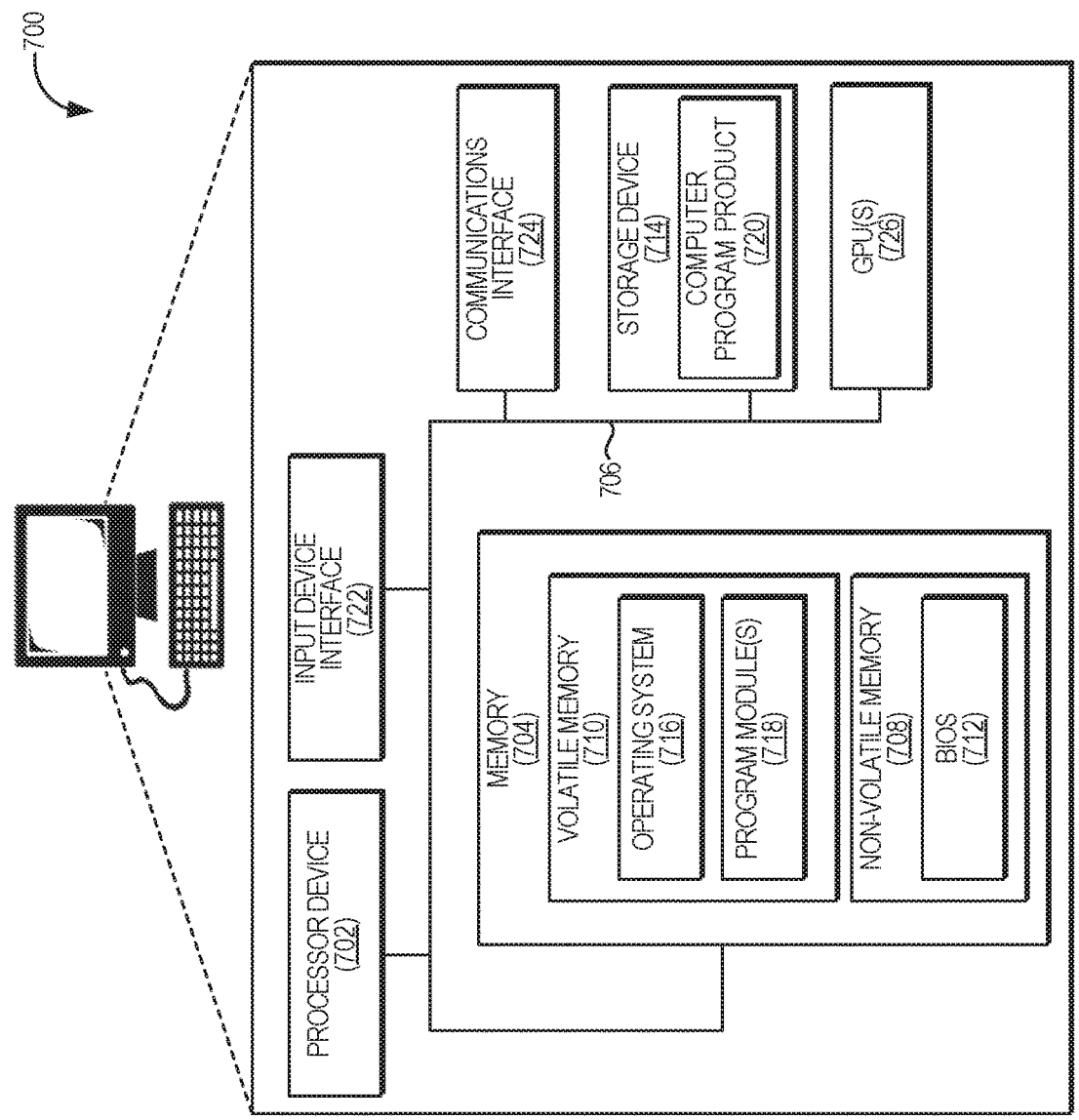
FIG. 7 is a block diagram of a computing device suitable for implementing embodiments disclosed herein.

FIG. 7 is a block diagram of a computing device 700, such as the network computing device 102 and the client computing device 108 of FIG. 1, suitable for implementing examples according to one embodiment. The computing device 700 may comprise any computing or electronic device capable of including firmware, hardware, and/or executing software instructions to implement the functionality described herein, such as a computer server or the like. The computing device 700 includes a processor device 702, a memory 704, and a system bus 706. The system bus 706 provides an interface for system components including, but not limited to, the memory 704 and the processor device 702. The processor device 702 can be any commercially available or proprietary processor.

The system bus 706 may be any of several types of bus structures that may further interconnect to a memory bus (with or without a memory controller), a peripheral bus, and/or a local bus using any of a variety of commercially available bus architectures. The memory 704 may include non-volatile memory 708 (e.g., read-only memory (ROM), erasable programmable read-only memory (EPROM), electrically erasable programmable read-only memory (EEPROM), etc.), and volatile memory 710 (e.g., random-access memory (RAM)). A basic input/output system (BIOS) 712 may be stored in the non-volatile memory 708 and can include the basic routines that help to transfer information between elements within the computing device 700. The volatile memory 710 may also include a high-speed RAM, such as static RAM, for caching data.

The computing device 700 may further include or be coupled to a non-transitory computer-readable storage medium such as the storage device 714, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 714 and other drives associated with computer-readable media and computer-usable media may provide non-volatile storage of data, data structures, computer-executable instructions, and the like, such as the VR content.

A number of modules can be stored in the storage device 714 and in the volatile memory 710, including an operating system 716 and one or more program modules 718 (e.g., such as the VR server 114 of FIG. 1), which may implement the functionality described herein in whole or in part. All or a portion of the examples disclosed herein may be implemented as a computer program product 720 stored on a transitory or non-transitory computer-usable or computer-readable storage medium, such as the storage device 714, which includes complex programming instructions, such as complex computer-readable program code, to cause the processor device 702 to carry out the steps described herein. Thus, the computer-readable program code can comprise software instructions for implementing the functionality of the examples described herein when executed by the processor device 702. The processor device 702 may serve as a controller, or control system, for the computing device 700 that is to implement the functionality described herein.

An operator may also be able to enter one or more configuration commands through a keyboard (not illustrated), a pointing device such as a mouse (not illustrated), or a touch-sensitive surface such as a display device. Such input devices may be connected to the processor device 702 through an input device interface 722 coupled to the system bus 706 but can be connected through other interfaces such as a parallel port, an Institute of Electrical and Electronic Engineers (IEEE) 1394 serial port, a Universal Serial Bus (USB) port, an IR interface, and the like.

The computing device 700 may also include a communications interface 724 suitable for communicating with the network 200 of FIG. 2 as appropriate or desired. The computing device 700 includes one or more GPUs 726.

Figure 8:
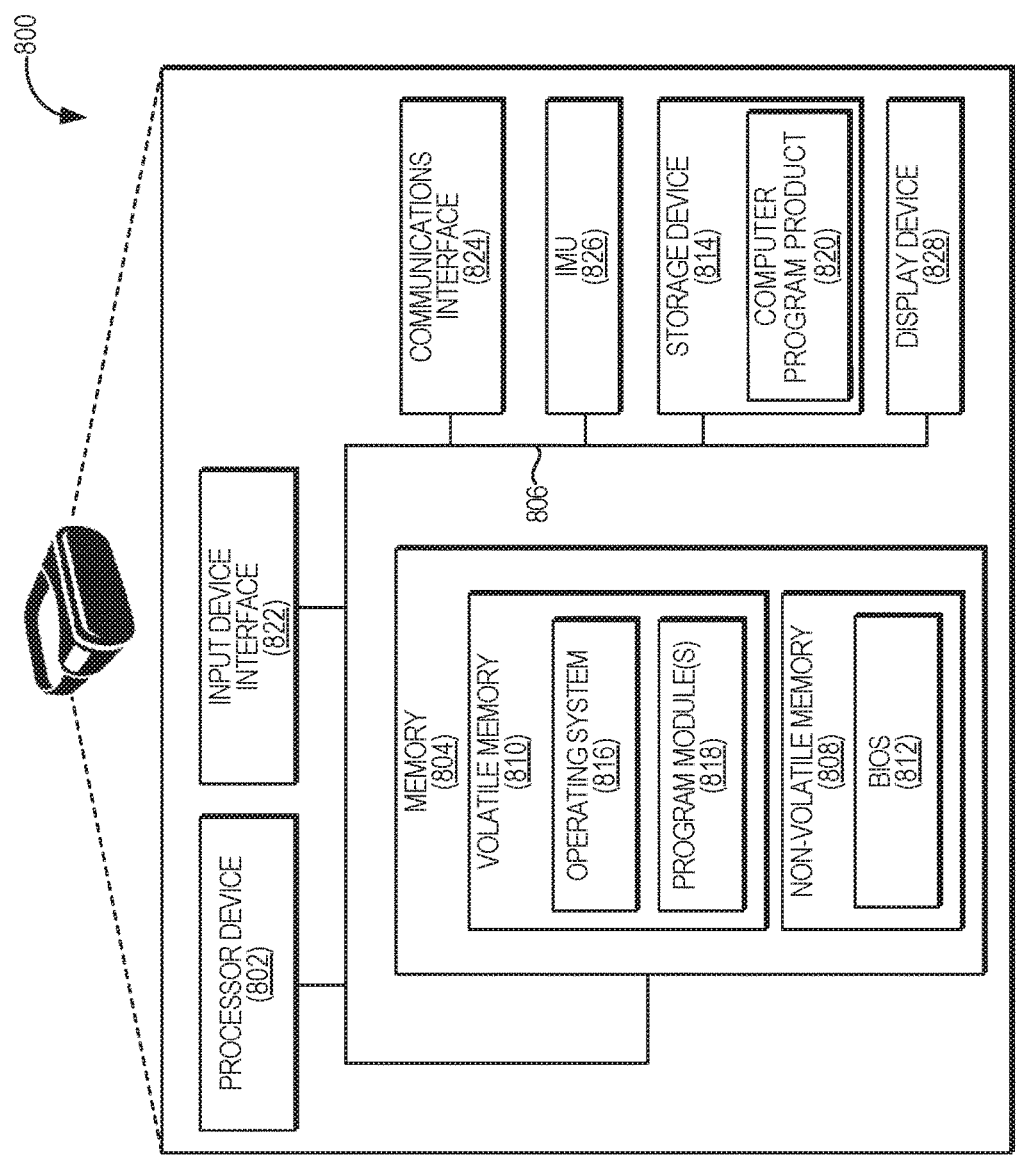
FIG. 8 is a block diagram of an HMDD suitable for implementing embodiments disclosed herein.

FIG. 8 is a block diagram of an HMDD 800, such as the HMDD 122 of FIG. 1, according to one embodiment. The HMDD 800 includes a processor device 802, a memory 804, and a system bus 806. The system bus 806 provides an interface for system components including, but not limited to, the memory 804 and the processor device 802. The processor device 802 can be any commercially available or proprietary processor.

The system bus 806 may be any of several types of bus structures that may further interconnect to a memory bus (with or without a memory controller), a peripheral bus, and/or a local bus using any of a variety of commercially available bus architectures. The memory 804 may include non-volatile memory 808 (e.g., read-only memory (ROM), erasable programmable read-only memory (EPROM), electrically erasable programmable read-only memory (EEPROM), etc.), and volatile memory 810 (e.g., random-access memory (RAM)). A basic input/output system (BIOS) 812 may be stored in the non-volatile memory 808 and can include the basic routines that help to transfer information between elements within the HMDD 800. The volatile memory 810 may also include a high-speed RAM, such as static RAM, for caching data.

The HMDD 800 may further include a non-transitory computer-readable storage medium such as a storage device 814, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 814 and other drives associated with computer-readable media and computer-usable media may provide non-volatile storage of data, data structures, computer-executable instructions, and the like.

A number of modules can be stored in the storage device 814 and in the volatile memory 810, including an operating system 816 and one or more program modules 818, which may implement the functionality described herein in whole or in part. All or a portion of the examples disclosed herein may be implemented as a computer program product 820 stored on a transitory or non-transitory computer-usable or computer-readable storage medium, such as the storage device 814, which includes complex programming instructions, such as complex computer-readable program code, to cause the processor device 802 to carry out the steps described herein. Thus, the computer-readable program code can comprise software instructions for implementing the functionality of the examples described herein when executed by the processor device 802.

An operator may also be able to enter one or more configuration commands through buttons or other input controls integrated into the HMDD 800, or via an external interface such as a keyboard (not illustrated) or a pointing device such as a mouse (not illustrated). Such input devices may be connected to the processor device 802 through an input device interface 822 coupled to the system bus 806 but can be connected by other interfaces such as a parallel port, an Institute of Electrical and Electronic Engineers (IEEE) 1394 serial port, a Universal Serial Bus (USB) port, an IR interface, and the like.

The HMDD 800 may also include a communications interface 824 suitable for communicating with a network, such as the network 200 of FIG. 2, as appropriate or desired. The HMDD 800 includes an IMU 826 and a display device 828. In some embodiments the HMDD 800 does not include a GPU.

Those skilled in the art will recognize improvements and modifications to the preferred embodiments of the disclosure. All such improvements and modifications are considered within the scope of the concepts disclosed herein and the claims that follow.

What is claimed is:

1. A method for measuring quality-of-experience (QoE) for virtual reality (VR) streaming content, comprising:
   streaming, via a network connection to a client computing device, VR content from a VR server of a network computing device to a VR head-mounted display device (HMDD) communicatively coupled to the client computing device;
   injecting, by the network computing device, one or more induced network impairments into the network connection while streaming the VR content;
   receiving, by the network computing device from the client computing device, a client-side VR stream capture and a client pose data set generated by the client computing device based on the VR content and the one or more induced network impairments;
   generating a source VR stream capture based on the VR content and the client pose data set without the one or more induced network impairments;
   performing a frame-by-frame comparison of the client-side VR stream capture and the source VR stream capture; and
   generating a QoE metric indicating a degree of degradation of the client-side VR stream capture relative to the source VR stream capture, based on the frame-by-frame comparison.

2. The method of claim 1, further comprising:
   recording, by the client computing device, movements of the HMDD while streaming the VR content from the VR server to the HMDD as the client pose data set;
   recording, by the client computing device, visual output of the HMDD as the client-side VR stream capture; and
   transmitting, by the client computing device, the client-side VR stream capture and the client pose data set to the network computing device.

3. The method of claim 2, wherein recording the movements of the HMDD while streaming the VR content from the VR server to the HMDD as the client pose data set comprises recording the movements of the HMDD while the HMDD is selectively rotated by a computer-controlled turntable to which the HMDD is affixed according to a rotation-and-velocity script.

4. The method of claim 1, wherein the client pose data set comprises data indicating one or more of a position of the HMDD and an orientation of the HMDD.

5. The method of claim 1, wherein the QoE metric comprises a Structural Similarity Index Metric (SSIM).

6. The method of claim 1, wherein the one or more induced network impairments comprises one or more of network latency, packet loss, and jitter.

7. The method of claim 1, further comprising identifying, based on the QoE metric, a network location from which to stream the VR content.

8. A computing system, comprising:
a network computing device comprising:
   a first memory; and
   a first processor device coupled to the first memory and configured to:
      stream, via a network connection to a client computing device, virtual reality (VR) content from a VR server of a network computing device to a VR head-mounted display device (HMDD) communicatively coupled to the client computing device;
      inject one or more induced network impairments into the network connection while streaming the VR content;
      receive, from the client computing device, a client-side VR stream capture and a client pose data set generated based on the VR content and the one or more induced network impairments;
      generate a source VR stream capture based on the VR content and the client pose data set without the one or more induced network impairments;
      perform a frame-by-frame comparison of the client-side VR stream capture and the source VR stream capture; and
      generate a quality-of-experience (QoE) metric indicating a degree of degradation of the client-side VR stream capture relative to the source VR stream capture, based on the frame-by-frame comparison.

9. The computing system of claim 8, further comprising: the client computing device comprising:
   a second memory; and
   a second processor device coupled to the second memory and configured to:
      record movements of the HMDD while streaming the VR content from the VR server to the HMDD as the client pose data set;
      record visual output of the HMDD as the client-side VR stream capture; and
      transmit the client-side VR stream capture and the client pose data set to the network computing device.

10. The computing system of claim 9, wherein the second processor device is configured to record the movements of the HMDD while streaming the VR content from the VR server to the HMDD as the client pose data set by being configured to record the movements of the HMDD while the HMDD is selectively rotated by a computer-controlled turntable to which the HMDD is affixed according to a rotation-and-velocity script.

11. The computing system of claim 8, wherein the client pose data set comprises data indicating one or more of a position of the HMDD and an orientation of the HMDD.

12. The computing system of claim 8, wherein the QoE metric comprises a Structural Similarity Index Metric (SSIM).

13. The computing system of claim 8, wherein the one or more induced network impairments comprises one or more of network latency, packet loss, and jitter.

14. The computing system of claim 8, wherein the first processor device is further configured to identify, based on the QoE metric, a network location from which to stream the VR content.

15. A computer program product stored on a non-transitory computer-readable storage medium and including computer-executable instructions configured to cause a processor device to:
   stream, via a network connection, virtual reality (VR) content from a VR server to a VR head-mounted display device (HMDD);
   inject one or more induced network impairments into the network connection while streaming the VR content;
   receive a client-side VR stream capture and a client pose data set generated based on the VR content and the one or more induced network impairments;
   generate a source VR stream capture based on the VR content and the client pose data set without the one or more induced network impairments;
   perform a frame-by-frame comparison of the client-side VR stream capture and the source VR stream capture; and
   generate a QoE metric indicating a degree of degradation of the client-side VR stream capture relative to the source VR stream capture, based on the frame-by-frame comparison.

16. The computer program product of claim 15 wherein the computer-executable instructions further cause the processor device to:
   record movements of the HMDD while streaming the VR content from the VR server to the HMDD as the client pose data set; and
   record visual output of the HMDD as the client-side VR stream capture.

17. The computer program product of claim 16, wherein the computer-executable instructions further cause the processor device to record the movements of the HMDD while streaming the VR content from the VR server to the HMDD as the client pose data set by causing the processor device to record the movements of the HMDD while the HMDD is selectively rotated by a computer-controlled turntable to which the HMDD is affixed according to a rotation-and-velocity script.

18. The computer program product of claim 15, wherein the QoE metric comprises a Structural Similarity Index Metric (SSIM).

19. The computer program product of claim 15, wherein the one or more induced network impairments comprises one or more of network latency, packet loss, and jitter.

20. The computer program product of claim 15, wherein the computer-executable instructions further cause the processor device to identify, based on the QoE metric, a network location from which to stream the VR content.

* * * * *